(12) United States Patent
Okamoto et al.

(10) Patent No.: US 11,491,893 B2
(45) Date of Patent: *Nov. 8, 2022

(54) METHOD FOR CONTROLLING FUEL CELL VEHICLES AND FUEL CELL VEHICLES

(71) Applicant: TOYOTA JIDOSHA KABUSHIKI KAISHA, Toyota (JP)

(72) Inventors: Yohei Okamoto, Toyota (JP); Hiroyuki Imanishi, Toyota (JP); Mitsuhiro Nada, Toyota (JP); Takashi Yamada, Hekinan (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 119 days.

This patent is subject to a terminal disclaimer.

(21) Appl. No.: 16/899,267

(22) Filed: Jun. 11, 2020

(65) Prior Publication Data

US 2020/0298729 A1    Sep. 24, 2020

Related U.S. Application Data

(63) Continuation of application No. 14/938,117, filed on Nov. 11, 2015, now Pat. No. 10,744,903.

(30) Foreign Application Priority Data

Nov. 12, 2014   (JP) .................................. 2014-230189

(51) Int. Cl.
*B60L 58/30*    (2019.01)
*B60Q 1/50*     (2006.01)
(Continued)

(52) U.S. Cl.
CPC ................. *B60L 58/30* (2019.02); *B60L 3/04* (2013.01); *B60Q 1/50* (2013.01);
(Continued)

(58) Field of Classification Search
CPC .. B60L 58/30; B60L 3/04; B60Q 1/50; H01M 8/04664; H01M 8/04992; H01M 2250/20; Y02T 90/40; Y02E 60/50
See application file for complete search history.

(56) References Cited

U.S. PATENT DOCUMENTS

2002/0034669 A1   3/2002   Kobayashi et al.
2003/0039869 A1   2/2003   Murakami et al.
(Continued)

FOREIGN PATENT DOCUMENTS

DE   102007050797 A1   7/2008
DE   102013114364 A1   6/2014
(Continued)

OTHER PUBLICATIONS

U.S. Appl. No. 14/938,117, filed Nov. 11, 2015.
(Continued)

*Primary Examiner* — Jeffrey C Boomer
(74) *Attorney, Agent, or Firm* — Finnegan, Henderson, Farabow, Garrett & Dunner, LLP

(57) ABSTRACT

Provided is a method for controlling a fuel cell vehicle capable of informing a user outside of the vehicle of the possibility that the fuel stops power generation and external power-feeding stops, whereby problems due to unexpected stopping of power feeding can be avoided. In a method for controlling a fuel cell vehicle 100 including an external power-feeding device 50, when it is determined that a state of a fuel cell exceeds a limiting point where deterioration of the fuel cell 20 or a failure of a driving device to supply fuel to the fuel cell 20 occurs during external power feeding, warning is issued to outside of the vehicle 10 before the fuel cell 20 stops power generation.

4 Claims, 5 Drawing Sheets

(51) Int. Cl.
  *B60L 3/04*    (2006.01)
  *H01M 8/04664*  (2016.01)
  *H01M 8/04992*  (2016.01)

(52) U.S. Cl.
  CPC .... *H01M 8/04664* (2013.01); *H01M 8/04992* (2013.01); *H01M 2250/20* (2013.01); *Y02T 90/40* (2013.01)

(56) References Cited

U.S. PATENT DOCUMENTS

| | | | |
|---|---|---|---|
| 2004/0062963 A1 | 4/2004 | Umayahara et al. | |
| 2004/0221641 A1 | 11/2004 | Moritsugu et al. | |
| 2004/0229097 A1* | 11/2004 | Hirakata | H01M 8/04007 429/442 |
| 2005/0181246 A1 | 8/2005 | Nakaji | |
| 2006/0032547 A1 | 2/2006 | Rossi | |
| 2006/0220819 A1 | 10/2006 | Nath et al. | |
| 2007/0031709 A1 | 2/2007 | Hosoe | |
| 2007/0172708 A1 | 7/2007 | Takebe et al. | |
| 2011/0008687 A1 | 1/2011 | Ballantine et al. | |
| 2011/0298422 A1 | 12/2011 | Failing | |
| 2012/0191385 A1 | 7/2012 | Mitsui et al. | |
| 2014/0080024 A1* | 3/2014 | Igarashi | H01M 8/04723 429/437 |
| 2014/0176325 A1 | 6/2014 | Park et al. | |
| 2014/0220470 A1 | 8/2014 | Matsumoto et al. | |
| 2014/0320163 A1 | 10/2014 | Haensel et al. | |
| 2015/0184804 A1 | 7/2015 | Handa | |
| 2016/0335815 A1 | 11/2016 | Ryu et al. | |

FOREIGN PATENT DOCUMENTS

| | | | |
|---|---|---|---|
| JP | 2002-033110 A | | 1/2002 |
| JP | 2004-158333 A | | 6/2004 |
| JP | 2007012429 A | * | 1/2007 |
| JP | 2007059415 A | * | 3/2007 |
| JP | 2009-081991 A | | 4/2009 |
| JP | 2012-016197 A | | 1/2012 |
| JP | 2013-198290 A | | 9/2013 |
| JP | 2013-198292 A | | 9/2013 |
| JP | WO2012-026052 A1 | | 10/2013 |
| JP | 2014-060068 A | | 4/2014 |
| KR | 10-2012-0099869 A | | 9/2012 |

OTHER PUBLICATIONS

Translation of DE 102007050797 obtained via ESPACENET on Oct. 4, 2019 (Year: 2008).
Translation of KR101231913 obtained via ESPACENET on Jun. 19, 2018 (Year: 2012).
Translation of JP2013198292_translated.pdf. Translation of JP 2013-198292 from ESPACENET obtained on Dec. 20, 2016.
Office Action issued in U.S. Appl. No. 14/938,117 dated Jan. 12, 2017.
Final Office Action issued in U.S. Appl. No. 14/938,117 dated Jun. 29, 2017.
Advisory Action issued in U.S. Appl. No. 14/938,117 dated Oct. 13, 2017.
Office Action issued in U.S. Appl. No. 14/938,117 dated Feb. 7, 2018.
Final Office Action issued in U.S. Appl. No. 14/938,117 dated Jul. 25, 2018.
Advisory Action issued in U.S. Appl. No. 14/938,117 dated Nov. 9, 2018.
Office Action issued in U.S. Appl. No. 14/938,117 dated Jan. 10, 2019.
Final Office Action issued in U.S. Appl. No. 14/938,117 dated May 20, 2019.
Advisory Action issued in U.S. Appl. No. 14/938,117 dated Oct. 10, 2019.
Office Action issued in U.S. Appl. No. 14/938,117 dated Dec. 18, 2019.
Notice of Allowance issued in U.S. Appl. No. 14/938,117 dated Apr. 16, 2020.

* cited by examiner

METHOD FOR CONTROLLING FUEL CELL VEHICLES AND FUEL CELL VEHICLES

CROSS-REFERENCE TO RELATED APPLICATIONS

This is a continuation of U.S. Application Ser. No. 14/938,117, filed on Nov. 11, 2015, which claims priority based on Japanese Patent Application No. 2014-230189, filed on Nov. 12, 2014, the disclosure of each of which is incorporated by reference herein in its entirety.

BACKGROUND OF THE INVENTION

Field of the Invention

The present invention relates to a method for controlling fuel cell vehicles including an external power-feeding device and enabling power-feeding externally.

Background Art

A fuel cell is a clean energy source to let hydrogen as fuel gas and air (oxygen) undergo electrochemical reaction for power generation and discharge water only. A fuel cell vehicle is configured to drive its motor by electricity generated by such a fuel cell for travelling.

In recent years fuel cell vehicles have attracted attention as a power-generating unit as well that enables power-feeding externally. Some fuel cell vehicles therefore include an external power-feeding device to feed electricity generated by a fuel cell to the outside Known external power-feeding devices include an inverter circuit.

As a technique relating to the external power-feeding from a fuel cell vehicle including an external power-feeding device, Patent Document 1 discloses issuance of warning to a driver on a driver seat if abnormality occurs at the inverter during external power feeding, for example.

CITATION LIST

Patent Document

[Patent Document 1] JP2013-198292 A

SUMMARY OF THE INVENTION

According to Patent Document 1, if abnormality occurs at the inverter during external power feeding, warning is issued to a driver on a driver seat. During external power, feeding from an external power-fee ding device, however, a user often will be outside of the vehicle. That is, the warning method disclosed by Patent document 1 may fail to inform a user outside of the vehicle of a failure or deterioration of the fuel cell, and so power-feeding may stop before the user knows.

In view of such circumstances, the present invention aims to provide a method for controlling a fuel cell vehicle capable of informing a user outside of the vehicle of the possibility that the fuel cell stops power generation and external power-feeding stops.

To fulfill the above-stated object, a method for controlling a fuel cell vehicle of the present invention is to control a fuel cell vehicle including an external power-feeding device, includes: when it is determined that a state of a fuel cell exceeds a limiting point where deterioration of the fuel cell or a failure of a driving device to supply fuel to the fuel cell occurs during external power feeding, issuing warning to outside of the vehicle before the fuel cell stops power generation.

In the method for controlling a fuel cell vehicle, the warning is preferably issued by an auxiliary device that is controlled by a controller of the fuel cell.

For instance, the warning may be issued by a horn or a lamp of the fuel cell vehicle. Alternatively, the warning may be issued through rotation of a fan of a radiator of the fuel cell vehicle.

When it is determined that the state of the fuel cell returns to the limiting point or lower after issuance of the warning, the fuel cell vehicle may be controlled to stop issuance of the warning.

According to the method for controlling a fuel cell vehicle of the present invention, since warning is issued to the outside of the vehicle before the fuel cell stops power generation, a user who is outside of the vehicle can be informed of the possibility that the fuel cell stops power generation and external power-feeding stops. The user therefore can perform adequate processing before external power-feeding stops, whereby problems due to unexpected stopping of power feeding can be avoided.

DESCRIPTION OF THE PREFERRED EMBODIMENTS

Figure 1:
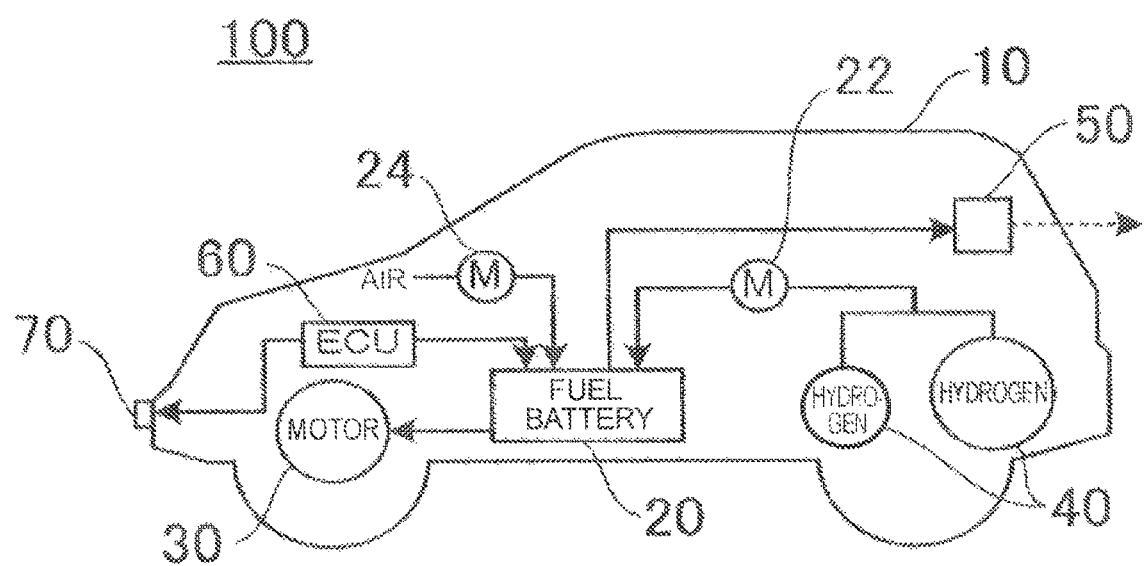
FIG. 1 schematically illustrates a fuel cell vehicle, to which a method for controlling fuel cell vehicles according to the first embodiment of the present invention is applied.

The following describes embodiments of the present invention. In the drawings, the same or similar reference numerals will be assigned to the same or similar parts. The drawings are schematic. This means that specific dimensions or the like have to be determined while referring to the following descriptions. Needless to say, the drawings include parts having a different relationship and proportion of the size from each other.

First Embodiment

Firstly referring to FIG. 1 the following describes a fuel cell vehicle, to which a method for controlling fuel cell vehicles according to the first embodiment of the present invention is applied. FIG. 1 schematically illustrates a fuel cell vehicle, to which a method for controlling fuel cell vehicles according to the first embodiment of the present invention is applied.

As illustrated in FIG. 1, a fuel cell vehicle 100 is configured to drive a motor 30 by electricity generated by a fuel cell 20 for travelling. The fuel cell 20 receives hydrogen as fuel gas supplied from a hydrogen tank 40 by a pump 22, and receives air by a compressor 24. The fuel cell vehicle includes a battery not illustrated, and so is configured to be capable of storing surplus electricity of the fuel cell 20 and regenerative electricity of the fuel cell vehicle 100 in the battery.

The fuel cell 20 has a stack, in which a plurality of cells are stacked (none of them are illustrated). For instance, a cell of a polymer electrolyte fuel cell at least includes a membrane electrode assembly (MEA) made up of an electrolyte membrane having ion permeability, and an anode-side catalyst layer (electrode layer) and a cathode-side catalyst layer (electrode layer) sandwiching the electrolyte membrane therebetween, and a gas diffusion layer to supply fuel gas or oxidant gas to the membrane electrode assembly. The cell is sandwiched between a pair of separators.

The fuel cell vehicle 100 includes an external power-feeding device 50 to feed electricity to the outside. The external power-feeding device 50 includes an inverter circuit, for example, and is electrically connected to the fuel cell 20. The fuel cell 20 is controlled by an electronic control unit (ECU) 60 as a controller.

The ECU 60 is electrically connected to an auxiliary device 70 that is a dedicated device to issue warning toward the outside of a vehicle 10. Examples of the auxiliary device 70 include a device capable of notifying abnormality to the outside of the vehicle 10, such as a horn, a lamp, or an external meter. These lamp, horn or external meter are perceivable devices for a user who is outside of the vehicle 10 during external power feeding.

Figure 2:
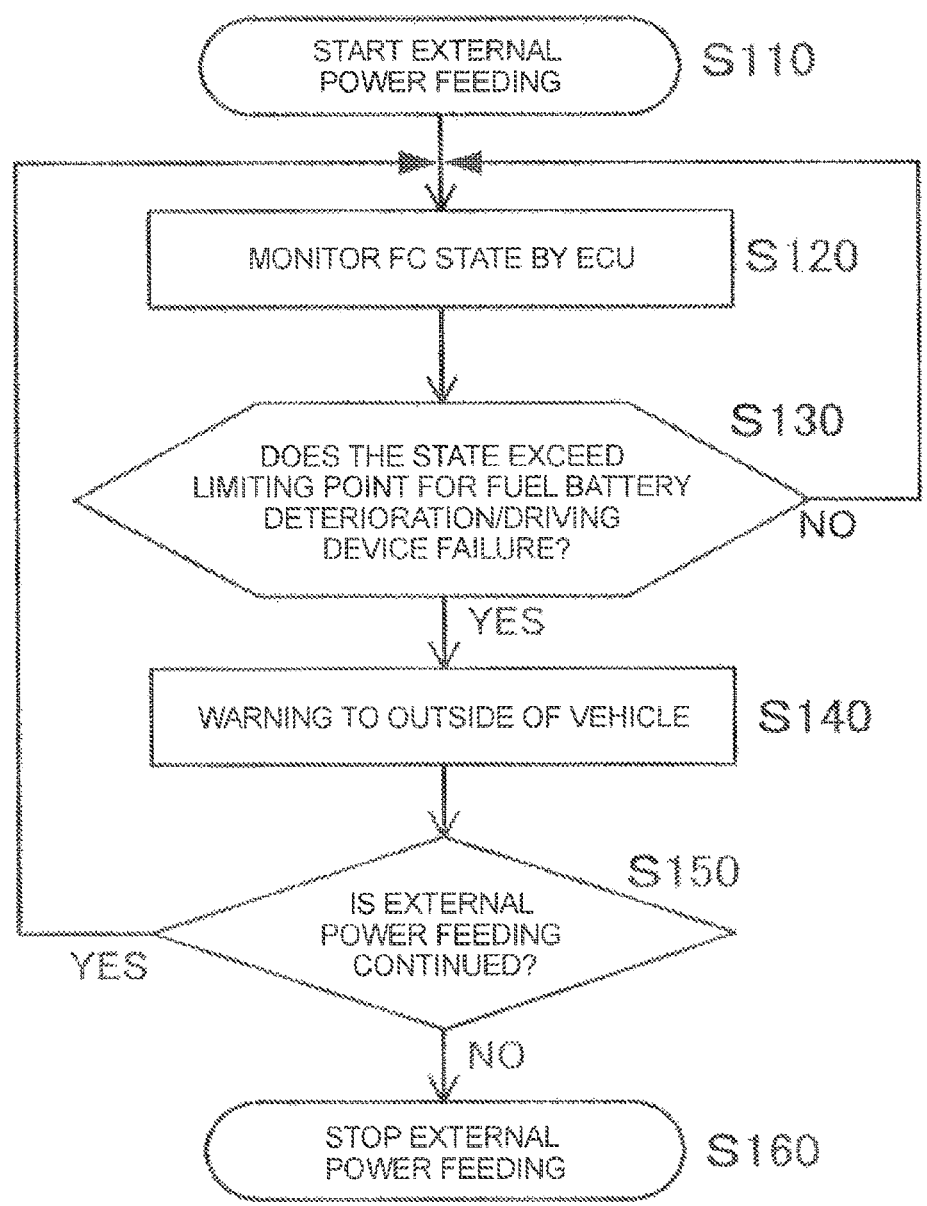
FIG. 2 is a flowchart of the method for controlling a fuel cell vehicle according to the first embodiment.
Figure 3:
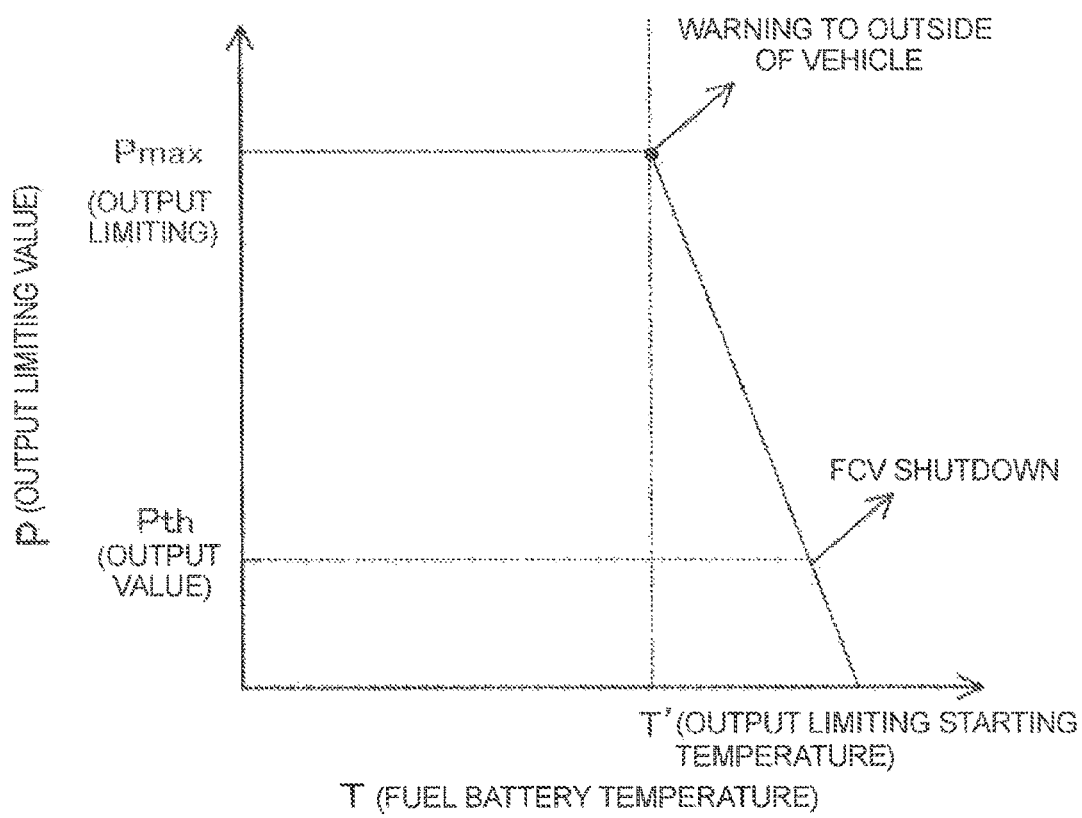
FIG. 3 is to explain the method for controlling a fuel cell vehicle according to the first embodiment.

Next, referring to FIGS. 1 through 4, a method for controlling a fuel cell vehicle according to the first embodiment is described below. FIG. 2 is a flowchart of the method for controlling a fuel cell vehicle according to the first embodiment. FIG. 3 is to explain the method for controlling a fuel cell vehicle according to the first embodiment.

As illustrated in FIG. 1, electricity generated by the fuel cell 20 of the fuel cell vehicle 100 can be fed to the outside via the external power-feeding device 50. During this external power feeding, outputting cannot be for some loads of the fuel cell 20. If high load is forcibly applied continuously, a failure or deterioration of the fuel cell 20 or of a driving device (e.g., the pump 22 or the compressor 24) to supply fuel to the fuel cell occurs, and so power requested to the fuel cell 20 (designated amount of power generation) has to be limited or external power feeding has to be stopped in some cases.

As illustrated in FIG. 2, the ECU 60 controls the fuel cell vehicle 100 as a whole. That is, when external power feeding starts (S110), the ECU 60 monitors the state of the fuel cell 20 (S120). The state of the fuel cell 20 is understood, for example, by measuring the internal temperature or the ambient temperature of the fuel cell 20 with a temperature sensor not illustrated. Such an ECU 60, which monitors the state of the fuel cell 20, can expect whether the fuel cell is in the state or not that causes deterioration of the fuel cell 20 or a failure in the driving device (e.g., the pump 22 or the compressor 24) to supply fuel to the fuel cell 20 during external power feeding (S130).

If the ECU 60 expects that the fuel cell is in the state that causes deterioration of the fuel cell 20 or a failure in the driving device to supply fuel to the fuel cell 20 (S130/YES), warning is issued toward the outside of the vehicle 10 before the fuel cell 20 stops power generation (S140).

The state that may cause deterioration of the fuel cell 20 or a failure in the driving device can be determined by whether the state of the fuel cell exceeds or not a limiting point that is a threshold by which determination can be made that deterioration occurs in the fuel cell 20 or a failure occurs in the driving device. Such a limiting point can be set, for example, as an output control starting temperature T' for the fuel cell 20 as illustrated in FIG. 3. If the internal temperature or the ambient temperature of the fuel cell 20 exceeds the output control starting temperature T' in FIG. 3 due to continuous operation of the fuel cell system in a high-load state, the fuel cell 20 cannot keep the amount of power generation constant, and so output limiting power P that specifies the upper limit of the electricity generated from the fuel cell 20 will be reduced. If the output limiting power P is further reduced to fall below a predetermined threshold Pth, then the output voltage FCV of the fuel cell 20 reaches voltage for shutdown, and then the fuel cell 20 stops power generation. The ECU 60 refers to a relational table or a relational expression that is a record of a relationship between the fuel cell temperature T and the output limiting value P corresponding to FIG. 3 while receiving, as an input value, the internal temperature or the environmental temperature of the fuel cell 20 that is measured by a temperature sensor not illustrated, and makes a comparison with a limiting point (in the example of FIG. 3, output control starting temperature T'). Then, warning is issued to the outside of the vehicle 10 before the output voltage FCV of the fuel cell 20 reaches a threshold for shutdown and at the stage where the internal temperature or the environmental temperature of the fuel cell 20 exceeds the output control starting temperature T' that is a limiting point.

Warning to the outside of the vehicle 10 can be issued by the auxiliary device 70 that is controlled by the ECU 60, for example. Specifically, warning is preferably issued by a horn or a lamp. This is because a user who is outside of the vehicle can be informed of a high-load state easily by sounds or light. Since warning is issued by the auxiliary device 70 under the control of the ECU 60 that is necessary for external power feeding during external power feeding, there is no need to provide another ECU for warning separately. On the other hand, when the ECU 60 does not expect a failure or deterioration of the fuel cell, or a failure of the driving device (S130: NO), monitoring of the fuel cell by the ECU 60 will be continued.

For instance, when the auxiliary device 70 is a lamp, the lamp may be controlled so as to turn on or blink, whereby overload of external power feeding can be notified. When the auxiliary device 70 is a horn, the horn may emit a sound continuously or intermittently, whereby overload of external power feeding can be notified. When the auxiliary device 70 is an external meter, reaching to the overload range may be displayed on the external meter, whereby overload of external power feeding can be notified. Warning may be issued by these plurality of auxiliary devices operating in parallel.

The mode of warning by the auxiliary device 70 may be changed in accordance with the state of the fuel cell 20, For instance, if the temperature of the fuel cell 20 exceeds the output control starting temperature T' in FIG. 3, then warning is issued by a lamp, and then if the temperature of the fuel cell 20 exceeds the temperature for FCV shutdown or the output limiting value P of the fuel cell 20 falls below the threshold Pth without any countermeasure such as load reduction for external power feeding being carried out, then warning is issued by a horn as well. Such a change in mode of the warning by the auxiliary device 70 enables notification of the degree of urgency of the state.

After issuance of the warning toward the outside of the vehicle 10, when external power feeding is to be continued (S150: YES), then the procedure returns back to S120 again, and the state monitoring of the fuel cell 20 is repeated (S130 to S140). On the other hand, when external power feeding is stopped (S150: NO), the processing ends (S160).

As is obvious from the flowchart of FIG. 2, even when warning is issued to the outside of the vehicle because the state of the fuel cell exceeds the limiting point for deterioration of the fuel cell 20 or a failure of the driving device (S130: YES) (S140), if the state of the fuel cell 20 returns to the limiting point or lower (S130: NO) during the following continuous external power feeding (S150: YES), then the warning toward the outside of the vehicle stops. Through such processing, a user who is outside of the vehicle can be informed that the fuel cell 20 can escape the overload state again because of countermeasures such as suspending of external power feeding or reducing of the amount of power generation after the notification of an overload state by warning. Then the external power feeding can be continued without interruption.

As described above, the method for controlling a fuel cell vehicle of the first embodiment has the following excellent advantageous effect. That is, the ECU 60 issues warning to the outside of the vehicle 10 before the fuel cell 20 stops power generation. Such warning to the outside of the vehicle 10 is issued by the auxiliary device 70 under the control of the ECU 60 of the fuel cell vehicle 100. A user who is outside of the vehicle 10 therefore can be informed by the warning from the auxiliary device 70 of the possibility that the fuel cell 20 stops power generation and so external power feeding is interrupted. The user can perform processing, such as reducing power requested to the external power-feeding device 50 or reducing load before external power feeding stops, whereby unexpected stopping of power feeding can be avoided.

Second Embodiment

Figure 4:
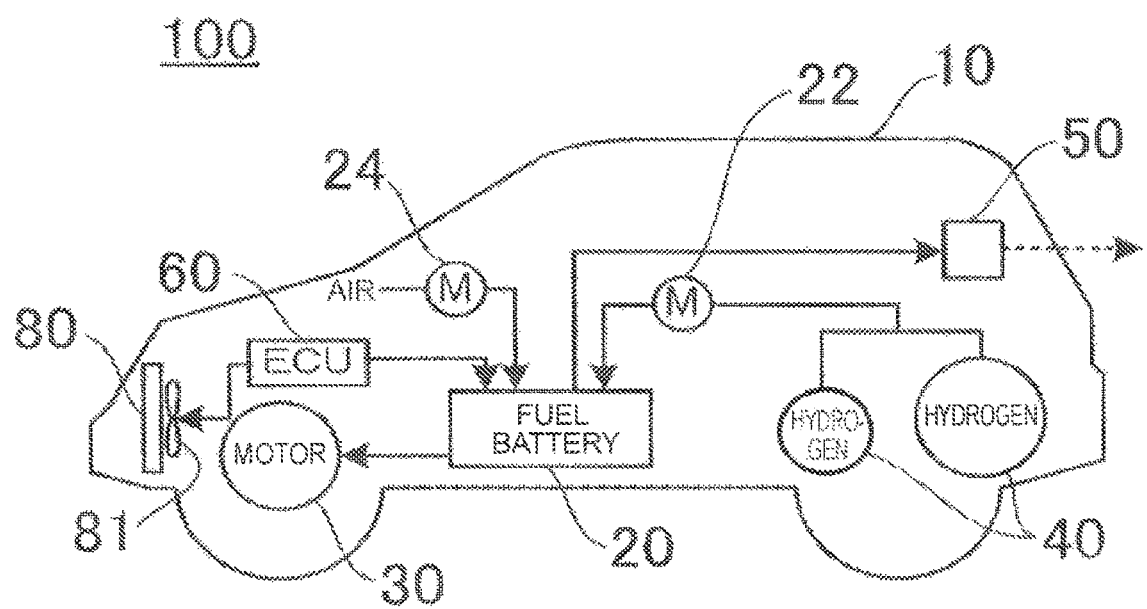
FIG. 4 schematically illustrates a fuel cell vehicle, to which a method for controlling fuel cell vehicles according to the second embodiment of the present invention is applied.
Figure 5:
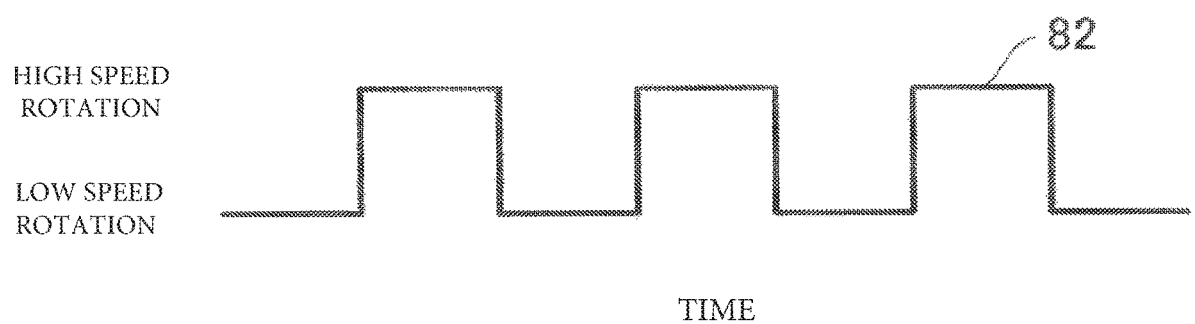
FIG. 5 is to explain the method for controlling a fuel cell vehicle according to the second embodiment.

Next referring to FIGS. 4 and 5, the following describes a fuel cell vehicle, to which a method for controlling fuel cell vehicles according to the second embodiment of the present invention is applied. FIG. 4 schematically illustrates a fuel cell vehicle, to which a method for controlling fuel cell vehicles according to the second embodiment of the present invention is applied. FIG. 5 is to explain the method for controlling a fuel cell vehicle according to the second embodiment.

Although the first embodiment as stated above issues warning to the outside by the auxiliary device 70 of the fuel well vehicle 100, the method for controlling fuel cell vehicles according to the second embodiment issues warning to the outside of the vehicle 10 through rotation of a fan 81 of a radiator 80 of the fuel cell vehicle 100 as illustrated in FIG. 4. The fan 81 of the radiator 80 is electrically connected to the ECU 60 that controls the fuel cell 20. The second embodiment therefore does not have to activate or control an ECU for warning to auxiliary devices separately.

Specifically as illustrated in FIG. 5, the rotation of the fan 81 of the radiator 80 is hunting-controlled 82 so that high-speed rotation and low-speed rotation are repeated, before power generation from the fuel cell 20 stops, whereby the rotating sound of the fan 81 is changed intermittently. Warning can be issued to a user who is outside of the vehicle 10 through such a change of the rotating sound of the fan 81.

The mode of warning by controlling the rotation of the fan 81 may be changed in accordance with the state of the fuel cell 20, For instance, hunting of the rotation of the fan 81 is performed with a relatively long period if the temperature of the fuel cell 20 exceeds the output control starting temperature T' in FIG. 3. Then, hunting of the rotation of the fan 81 is performed with a relatively short period if the temperature of the fuel cell 20 exceeds the FCV shutdown temperature or the output limiting value P of the fuel cell 20 falls below the threshold Pth temperature without any countermeasure such as load reduction for external power feeding being carried out. Such a change in mode of the warning by the hunting of the rotation of the fan 81 enables notification of the degree of urgency of the state.

Further warning by the auxiliary device 70 according to the first embodiment as stated above and warning by the rotation of the fan 81 may be combined. For instance, hunting of the rotation of the fan 81 is started if the temperature of the fuel cell 20 exceeds the output control starting temperature T in FIG. 3. Then if the temperature of the fuel cell 20 exceeds the FCV shutdown temperature or the output limiting value P of the fuel cell 20 falls below the threshold Pth temperature without any countermeasure such as load reduction for external power feeding being carried out, then warning by the auxiliary device 70 also is issued additionally. Such a change in mode of the warning by combining the warning by the fan 81 and the warning by the auxiliary device 70 enables notification of the degree of urgency of the state.

The method for controlling fuel cell vehicles according to the second embodiment basically has a similar advantageous effect to that of the method for controlling fuel cell vehicles according to the first embodiment. Especially according to the method far controlling fuel cell vehicles of the second embodiment, warning is issued by an auxiliary device that is used during external power feeding, and therefore this embodiment has an advantageous effect that there is no need to drive an auxiliary device separately that does not directly relate to external power feeding.

Other Embodiments

That is a description of the present invention by way of the embodiments, and it should not be understood that the description and the drawings that form a part of this disclosure limit the present invention. Various alternative embodiments, examples, and operational techniques should be apparent for those skilled in the art from this disclosure. For instance, although warning is issued by a single auxiliary device in the embodiments as stated above, warning may be issued by combining a plurality of auxiliary devices. In this way, it should be understood that the present invention encompasses various embodiments that are not described here, 10 vehicle
20 fuel cell
22 pump
24 compressor
50 external power-feeding device
60 electronic control unit (ECU)
70 auxiliary device
80 radiator
81 fan
100 fuel cell vehicle

What is claimed is:
1. A method for controlling a fuel cell vehicle including a circuit that feeds an electric power produced by a fuel cell to outside of the fuel cell vehicle, comprising:
  determining, using an electronic control unit configured to monitor a state of the fuel cell, that the state of the fuel cell exceeds a threshold value indicative of deterioration of the fuel cell or a failure of a pump or compressor that supplies fuel to the fuel cell occurs during external power feeding, and issuing an audio warning, using the electronic control unit, that is detectable by a user outside of the vehicle, based on the determination, before the fuel cell stops power generation, wherein the warning is issued, using the electronic control unit, through rotation of a fan of a radiator of the fuel cell vehicle while the fan is hunting-controlled so that high-speed rotation and low-speed rotation are repeated, whereby the rotating sound of the fan is changed intermittently.

2. The method for controlling a fuel cell vehicle according to claim 1, wherein when it is determined, using the electronic control unit, that the state of the fuel cell returns to the threshold value or lower after issuance of the warning, issuance of the warning is stopped.

3. A fuel cell vehicle, comprising:
a fuel cell;
a pump or compressor that supplies fuel to the fuel cell;
a circuit that feeds an electric power produced by the fuel cell to outside of the fuel cell vehicle; and
an electronic control unit programmed to:

determine that a state of the fuel cell exceeds a threshold value indicative of deterioration of the fuel cell or the pump or compressor fails during external power feeding, and issue an audio warning, using the electronic control unit, that is detectable by a user outside of the vehicle, based on the determination, before the fuel cell stops power generation, wherein the warning is issued, using the electronic control unit, through rotation of a fan of a radiator of the fuel cell vehicle while the fan is hunting-controlled so that high-speed rotation and low-speed rotation are repeated, whereby the rotating sound of the fan is changed intermittently.

4. The fuel cell vehicle according to claim 3, wherein the electronic control unit is programmed to further perform, when it is determined, using the electronic control unit, that the state of the fuel cell returns to the threshold value or lower after issuance of the warning, stopping issuance of the warning.

* * * * *